Oct. 20, 1936.                J. E. TRAINER                2,057,861
WELDROD
Filed Oct. 11, 1932
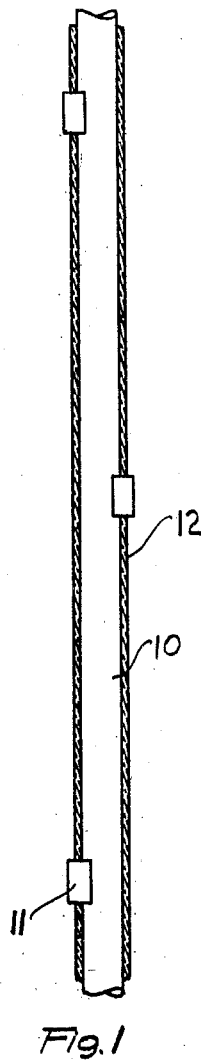
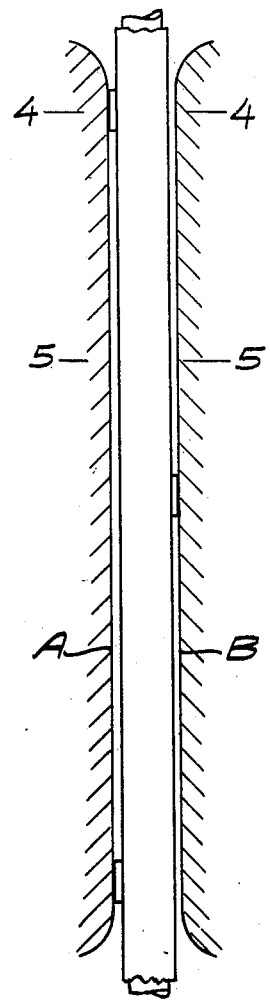
Fig.1    Fig.2    Fig.3
INVENTOR
JAMES E. TRAINER
BY
ATTORNEY Patented Oct. 20, 1936

2,057,861

UNITED STATES PATENT OFFICE 2,057,861

WELDROD

James E. Trainer, Fairlawn, Ohio, assignor to The Babcock & Wilcox Company, Bayonne, N. J., a corporation of New Jersey Application October 11, 1932, Serial No. 637,234

15 Claims. (Cl. 219—8)

This invention relates to a coated weldrod for use primarily in electric welding of the arc classification.

In weldrods for the aforesaid character of welding it is sometimes important that the weldrod carry a coating which is of a character adapted to contribute importantly to the welding operation; such coatings or coverings may be of the order of either thick or thin, as conditions may require, but in any event have a dielectric characteristic which renders it desirable to provide some adjunct whereby the electric current is transmitted between the rod and adjacent current carrying parts such, for instance, as the weldrod feeding head which may be of either the automatic or manually controlled type.

Heretofore many ways of effecting current carrying contact between weldrod and supply have been resorted to as, for instance, a bare strip extending lineally of the rod, but this has the objection of decreasing the coated or covered surface to too large an extent; and then, also, contact has been effected by creating bare portions on the weldrod by grinding off portions of the coating after it has been applied, but this has the disadvantage of rendering necessary some form of toothed arrangement to enter the depressions; then, again spurs have been used which pierce the coating but in this way contact is uncertain.

The present invention provides a weldrod having a coating or covering of the character mentioned in the foregoing and which is constituted of a metal core formed with lineally spaced projections extending at least through the coating to provide for electrical contact.

In addition the lineally spaced projections are also circumferentially spaced, and they may be arranged so that while they collectively constitute but a small portion of the weldrod surface that is bare, they also are of adequate area to provide efficient contact for the current to be carried.

A further object is to arrange the aforesaid contact projections in combination with current carrying surfaces such, for instance, as shoes between which the electrode passes, that there are always several of the projections in contact with the said surfaces.

Another feature is that by forming and arranging the projections from the body of the metal core of the weldrod the mass of metal entering the arc is always uniform in cross sectional area, irrespective of whether the portion entering the arc does or does not carry a projection.

Also it is to be noted that when the projections are above the surface of the covering or coating there is no tendency of the contact means to crack or rub the coating or covering.

In the drawing annexed hereto and forming a part of this specification I have illustrated a desirable form of the weldrod of the present invention for the purpose of making such disclosure as is required by the patent statutes; in the drawing—

Fig. 1 is a fragmentary side elevation of a weldrod with the coating or covering cut away to disclose the core;

Fig. 2 is a side elevation of the weldrod shown in Fig. 1 in position between contact surfaces;

Fig. 3 is a view similar to Fig. 2 but showing the spacing of the contact projections such that there will always be one contact member having more than one contact projection engaging therewith.

Fig. 4 is a transverse section on the line 4—4 of Fig. 2, and

Fig. 5 is a transverse section on the line 5—5 of Fig. 2.

In detail

The weldrod as shown in the drawing comprises a metal core or body 10 deformed at spaced lineal and circumferentially disposed locations to provide the upstanding projections 11 which constitute the contact locations on the finished weldrod. These projections 11 may be produced by any suitable process as by rolling, swaging, or the like and collectively constitute a very small percentage of the total surface area of the weldrod core or body 10.

Applied to the metal core or body 10 by any suitable method is a coating or covering 12 that assists in the perfection of the weld such, for instance, as the coating or covering material set forth in the copending application of James C. Hodge and Magnus Christensen, Serial No. 594,160, filed in the United States Patent Office February 20, 1932.

The aforesaid coating or covering is designated at 12 and is of uniform thickness and concentric with the weldrod body or core 10; the thickness of the said covering or coating 12 is sufficient only so that it provides an adequate amount of the material for welding with a weldrod core 10 of the diameter selected and the projections 11 may extend either flush with the coating or covering 12, or may project slightly above the same, as shown. The projections, weldrod core and coating may all be proportioned to each other and to the current to be carried, and are so constituted that the substances thereof, under welding conditions, promote good welding operations by surrounding and protecting the arc working area and molten or highly heated metal.

Adjacent the weldrod are contact shoes or surfaces A and B, or other similar elements, which function to carry the current and which are proportioned along with the lineal and circumferential spacing of the projections 11 on the weldrod so that the said shoes or surfaces are always in contact with more than one of the projections 11, and preferably one of the shoes or surfaces A or B is in contact with more than one projection 11 at all times, though the area of only one projection may be of an extent to carry the total welding current for the particular size weldrod selected to do a job.

While in the foregoing I have described and illustrated a specific form of weldrod it is to be understood that such weldrod may be in the form of long lengths of coiled wire, or may be relatively short stiff straight lengths and may have either a thick or thin covering or coating 12, and that while the projections 11 have been indicated as rectangular they may be square, round, diamond shape or oval, and in the latter cases with their major axis disposed either transversely, longitudinally or diagonally with respect to the axis of the weldrod and in no event do I expect by the description set forth herein to limit my invention to any particular form except as such limitations are impressed upon the invention by the appended claims defining the same.

I claim:

1. A weldrod comprising a metal core and a coating therefor, the said metal core having a plurality of lineally spaced and entirely separate projections extending through said coating to provide for electrical contact, the coating completely circumscribing the projections so as to constitute a substantially continuous sheath for the rod.

2. A weldrod comprising a metal core and a coating therefor, the said metal core having preformed thereon from the metal of the core body prior to the application of the said coating, a series of lineally spaced projections extending through the coating to provide for electrical contact, the coating completely circumscribing the projections so as to constitute a substantially continuous sheath for the rod.

3. A weldrod comprising a metal core provided with a coating of uniform thickness, the said core having a group of lineally spaced projections extending through the coating to provide for electrical contact, the coating completely circumscribing the projections so as to constitute a substantially continuous sheath for the rod.

4. A weldrod comprising a metal core having integrally formed lineally spaced contact projections, and a non-metallic covering or coating wholly sheathing the body of the core exclusive of at least the contact surfaces of said projections.

5. A weldrod comprising a metal core having integrally formed lineally spaced contact projections at diametrically opposite lineal locations, and a non-metallic covering or coating wholly sheathing the body of the core exclusive of at least the contact surfaces of said projections.

6. A weldrod comprising a metal core provided with a coating of uniform thickness, the said core having lineally and circumferentially spaced projections at least exposed through the coating to provide for electrical contact, the coating completely circumscribing the projections so as to constitute a substantially continuous sheath for the rod.

7. A weldrod comprising a metal core provided with a coating of uniform thickness, the said core having lineally and circumferentially spaced projections at least extending through the coating to provide for electrical contact and collectively providing a lesser exposed surface than any single rib of a width equal to any one of the said projections, the coating completely circumscribing the projections so as to constitute a substantially continuous sheath for the rod.

8. The method of forming a covered or coated weldrod which comprises upsetting or swaging contact projections on a welded core, and then coating the core with a welding assistant to a thickness at least no greater than the extent of the aforesaid projections.

9. A coated or covered metal core weldrod having contact projections integral with the core and each proportioned to carry the total current required by the size of the weldrod, the coating completely circumscribing the projections so as to constitute a substantially continuous sheath for the rod.

10. In combination, a coated or covered metal core weldrod having contact projections integral with the core and extending at least through the coating or covering, and contact members each arranged for contact with at least one of said projections, the coating completely circumscribing the projections so as to constitute a substantially continuous sheath for the rod.

11. In combination, a coated or covered metal core weldrod having contact projections extending at least through the coating or covering, and contact members each arranged for contact with said projections with one member of the members always in contact with more than one projection, the coating completely circumscribing the projections so as to constitute a substantially continuous sheath for the rod.

12. A weldrod having projections produced from the body of the rod whereby the cross sectional area at locations free from projections is identical with the cross sectional area through said projections.

13. A metallic weldrod having at spaced and separate positions projections struck up from the metal body of the rod so as to leave the rod with a substantially uniform conductive cross section, and an electrically non-conductive coating covering the rod and circumscribing the projections, the projections extending beyond the exterior surface of the coating a substantial distance sufficient to prevent electrical contact means from cracking or rubbing the coating.

14. An arc welding electrode having a coating of flux through which extend fin-like projections forming an integral part of said electrode.

15. A flux coated arc welding electrode provided with fin-like projections separated from one another circumferentially as well as lengthwise of said electrode and of a height substantially equal to the thickness of said flux coating.

JAMES E. TRAINER.